(12) United States Patent
Gentric

(10) Patent No.: US 7,912,218 B2
(45) Date of Patent: Mar. 22, 2011

(54) METHOD OF BROADCASTING MULTIMEDIA CONTENT VIA DISTRIBUTION NETWORK

(75) Inventor: Philippe Gentric, Fourqueux (FR)

(73) Assignee: NXP B.V., Eindhoven (NL)

( * ) Notice: Subject to any disclaimer, the term of this patent is extended or adjusted under 35 U.S.C. 154(b) by 1316 days.

(21) Appl. No.: 10/562,531

(22) PCT Filed: Jun. 23, 2004

(86) PCT No.: PCT/IB2004/002140
§ 371 (c)(1),
(2), (4) Date: Dec. 28, 2005

(87) PCT Pub. No.: WO2005/004485
PCT Pub. Date: Jan. 13, 2005

(65) Prior Publication Data
US 2006/0156377 A1    Jul. 13, 2006

(30) Foreign Application Priority Data

Jul. 4, 2003 (EP) .................................. 03300050
Oct. 10, 2003 (EP) .................................. 03292520

(51) Int. Cl.
*H04N 7/167* (2011.01)
*H04L 9/00* (2006.01)
*H04L 9/18* (2006.01)
(52) U.S. Cl. ......... 380/232; 380/231; 380/230; 380/233; 380/239; 380/210; 713/155; 713/159; 713/189; 713/193; 709/231; 709/229
(58) Field of Classification Search .................. None
See application file for complete search history.

(56) References Cited

U.S. PATENT DOCUMENTS

| 5,168,356 | A  | * | 12/1992 | Acampora et al. | ........ 375/240.15 |
| 5,822,603 | A  | * | 10/1998 | Hansen et al. | .................... 712/1 |
| 7,028,096 | B1 | * | 4/2006  | Lee | .............. 709/231 |
| 7,466,823 | B2 | * | 12/2008 | Vestergaard et al. | ......... 380/227 |
| 7,624,282 | B2 | * | 11/2009 | Hollar | ........... 713/189 |
| 2001/0021999 | A1 | * | 9/2001 | Seifert | ........... 725/87 |
| 2004/0003267 | A1 | * | 1/2004 | Strom et al. | ................. 713/193 |

(Continued)

FOREIGN PATENT DOCUMENTS

EP    1187423 A2    3/2002

(Continued)

OTHER PUBLICATIONS

Johanson, M. "An RTP to HTTP Video Gateway", WWW10, 10 pgs. (May 1-5, 2001).

*Primary Examiner* — Syed A. Zia

(57) ABSTRACT

The invention proposes to divide a content to be transmitted via a network into a set of slices and to generate a set of files from this set of slices. The slices (or the files) are encrypted before downloading in such a way that the client cannot use the slice (or the file) before having acquired the associated decryption key. The invention thereby allows protecting a downloaded content on a slice-by-slice basis (or on a file-by-file basis) rather than protecting a downloaded content as a whole. The transmission (in download mode) between the server and the client is ruled by the HTTP protocol that is accepted by all firewalls and NAT. Consequently, the transmitted content is accessible for any client device that has access to the Web without restriction. Advantageously, the slices can be decoded independently of each other.

12 Claims, 4 Drawing Sheets

U.S. PATENT DOCUMENTS

| | | | |
|---|---|---|---|
| 2004/0073947 A1* | 4/2004 | Gupta | 725/134 |
| 2004/0088557 A1* | 5/2004 | Malcolm et al. | 713/193 |
| 2005/0031097 A1* | 2/2005 | Rabenko et al. | 379/93.31 |
| 2007/0250901 A1* | 10/2007 | McIntire et al. | 725/146 |
| 2009/0010426 A1* | 1/2009 | Redmond | 380/29 |

FOREIGN PATENT DOCUMENTS

| | | |
|---|---|---|
| WO | 91/03112 A1 | 3/1991 |
| WO | WO0198920 A1 | 12/2001 |
| WO | 2005/004485 A1 | 1/2005 |

* cited by examiner

METHOD OF BROADCASTING MULTIMEDIA CONTENT VIA DISTRIBUTION NETWORK

FIELD OF THE INVENTION

The present invention relates to a method of transmitting a multimedia content to a client device. The invention also relates to a system, a content server, and a client device specifically designed to implement such a transmission method.

The invention has interesting applications for the transmission of pay content to client devices via the Internet, in particular for the transmission of live content (live events, live shows, broadcast TV programs and the like).

BACKGROUND OF THE INVENTION

European patent application n°1 187 423 describes methods of transmitting on-demand information whose content varies with time, like music or video. In particular, it describes a so-called buffering distribution method that consists in dividing a single piece of content into a plurality of files and in downloading the content file by file, starting from the first file. This buffering distribution method is described as providing the advantage of reducing the waiting time before starting playback (while part N is being downloaded, part N-1 can be played).

One of the objects of the invention is to propose improvements for such a distribution method.

SUMMARY OF THE INVENTION

This is achieved with a system as defined in claims 1 to 3, a content server as defined in claims 4 to 7, a client device as defined in claims 8 and 9 and a method as defined in claim 10.

A system according to the invention comprises:
a source for acquiring a multimedia content,
an encoder for encoding said multimedia content,
a slicer for slicing said encoded multimedia content into at least one set of slices, and for providing at least one set of files from said at least one set of slices, said slicer implementing an encryption algorithm, such that at least the slice contained in a file cannot be used without a decryption key associated therewith,
a distribution network,
an access provider for providing a client device with an access to said distribution network,
a content server linked to said distribution network and having access to said set or sets of files for downloading at least one of said files to said client device via said distribution network upon reception of a request from said client device, and
a key server linked to said distribution network for providing said client device with the decryption key or keys that are associated with the downloaded files.

With the invention, the content is divided into a set of slices and a file is generated for each slice. The slices (or the files) are encrypted before downloading in such a way that the client device cannot use the slice (or the file) before having acquired the associated decryption key. The invention thereby allows protecting a downloaded content on a slice-by-slice basis (or on a file-by-file basis) rather than protecting a downloaded content as a whole.

This is advantageous for the following reason: when the downloaded content is protected via encryption, the decryption key is usually provided after the download has been completed so as to make sure that the download was successful (thereby eliminating the risk that the client pays for something that he will eventually not receive) and to avoid that the client may watch the content and disconnect before being charged. Protecting the slices (or the files) one by one (or group by group) allows the client to decrypt and therefore start playing the content before all the files are downloaded while making sure that the client received correctly what he paid for, and cannot use what he did not pay for.

With the invention, the client does not have to pay for the whole content beforehand. Payment is progressive as playing goes along. The client can start playing a content and disconnect before the whole content has been downloaded if he wishes to do so. In such a case he will only pay for what he eventually received.

The invention safeguards the interests of both the content provider and the client.

According to the invention, the file-based content is downloaded from the content server to the client device via a point-to-point connection. On IP networks, point-to-point connections are usually ruled by the HTTP protocol (Hyper Text Transfer Protocol, defined in the RFC2616 of the IETF). The HTTP protocol is the basis for the World Wide Web and therefore has the great advantage of being accepted by all firewalls and Networks Address Translators (which is not the case with the RTP/UDP transport protocol). This means that the transmitted content will be accessible for any client device having access to the World Wide Web without restriction. Another advantage of using a downloading distribution mode is that it is highly reliable.

However, using a downloading distribution mode of the type described in European patent application n°1187423 has the drawback that all files have to be transmitted, starting from the first file. With such a downloading distribution mode, the client cannot access the content at random. Transmission of a live content (that is, a content made available in real-time, like live events, live shows, broadcast TV programs, . . . ) cannot be achieved.

In an advantageous embodiment of the invention, the slices are generated in such a way that they can be decoded independently of each other. This means that the client does not need to receive the content from its beginning. It can start receiving the content from any slice. When a client sends an initial request directed to a live content, he will receive either the previous file (which means he will receive slightly outdated information) or he will have to wait for the next file to get ready.

With the invention, it is also possible to download one file only, upon reception of a request by a client device. This is advantageous for certain applications, for example, to allow clients to get a quick overview of the results during championships.

When a plurality of files is to be downloaded, the files can be either fetched one by one by the client device or sent one by one by the content server upon reception of an initial request. In practice, it is not certain that all client browsers will support reception of several files in response to one single request. Therefore, it will usually be preferred that the client device fetches the files one by one (i.e. sends a fetching request for each file to be downloaded). The client device can be designed specifically so as to automatically send the fetching request at the appropriate time. Alternatively, the content server can send a document to the client device, said document causing the client device to repetitively send a fetching request. Advantageously, said document comprises an instruction for the client device to send a subsequent fetching request a certain amount of time before the end of the playback of the previous file. In such a way, it is ensured that the next file will reach the client device early enough, and that the client will not experience any gap in the playback process.

BRIEF DESCRIPTION OF THE DRAWINGS

These and other aspects of the invention are further described with reference to the following drawings.

DESCRIPTION OF EMBODIMENTS

Figure 1:
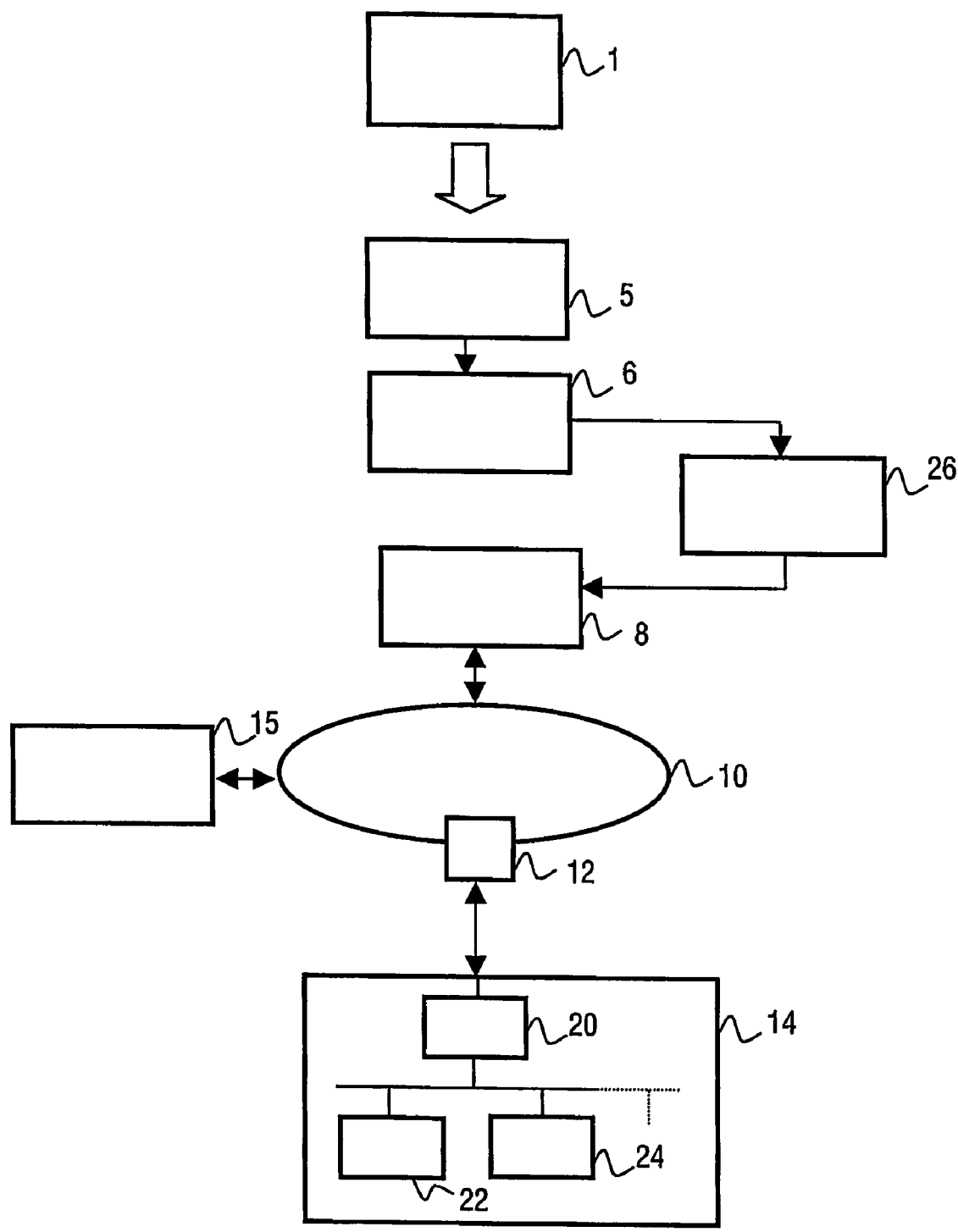
FIG. 1 is a schematic representation of a first example of a system according to the invention.

FIG. 1 is a schematic diagram of a first example of a system according to the invention. The system of FIG. 1 comprises:
- a source 1 for acquiring a multimedia content;
- an encoder 5 for encoding a received multimedia content,
- a slicer 6 for slicing an encoded multimedia content into a set of slices and for providing a set of files, each file containing a slice of said encoded multimedia content, said slicer implementing an encryption algorithm, such that at least the slice contained in a file cannot be used without a decryption key associated therewith,
- a content server 8 having access to said files,
- a distribution network 10, the content server 8 being linked to the distribution network 10,
- an access provider 12 for providing a client device 14 with an access to the distribution network 10,
- a key server 15 linked to the distribution network 10 for providing the client device 14 with the decryption key or keys that are associated with the downloaded files.

In the system of FIG. 1, the source 1, the encoder 5 and the slicer 6 may be physically located in one or in several devices.

Figure 2:
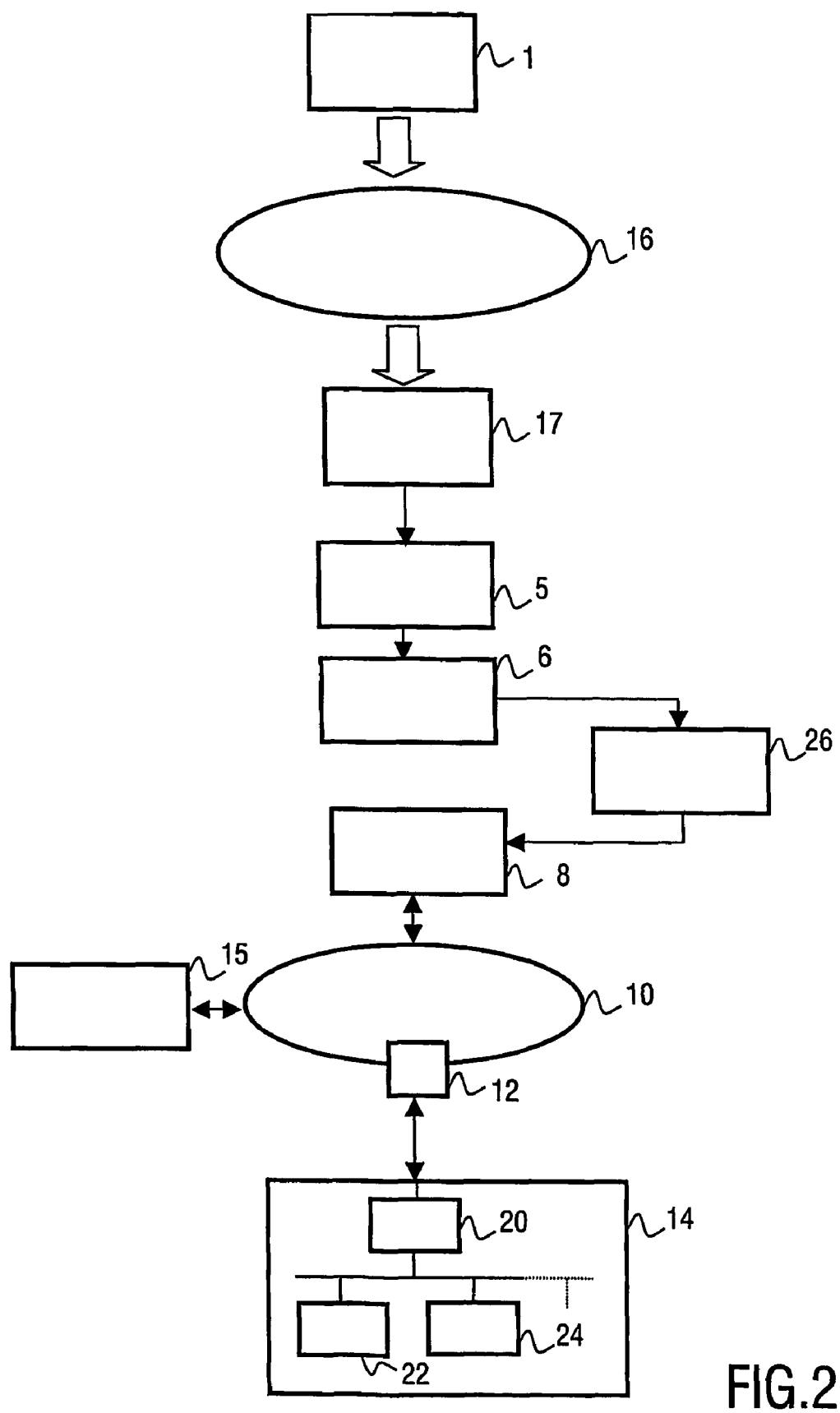
FIG. 2 is a schematic representation of a second example of a system according to the invention.

FIG. 2 is a schematic representation of a second example of a system according to the invention. In addition to the elements described above with reference to FIG. 1, the system of FIG. 2 comprises:
- a broadcasting system 16 for broadcasting the multimedia content provided by the source 1; and
- a receiver 17 for receiving the broadcast multimedia content, and forwarding the received multimedia content to the slicer 6.

The client device 14 has (amongst other means not represented in FIG. 1) a communication unit 20 for transmission/reception to/from the access provider 12, a player 22 for playing an encoded multimedia content, and a display 24 for displaying a multimedia content. The client device 14 may be either a mobile device (like a mobile phone), in which case the communication unit 20 is a radio communication unit, or a wired device (like a PC), in which case the communication unit 20 is a wired communication unit. The distribution network 10 is typically the Internet network.

The broadcasting system 16 is, for instance, a satellite broadcasting network and the receiver 17 is a satellite receiver. This is not restrictive: any other broadcasting means could be used instead of satellite broadcasting means. The broadcast multimedia content may be any multimedia content that is transmitted and can be received by a number of receivers including the receiver 17. The broadcast multimedia content may be, for instance, a television program, a pre-recorded event/program, a live event, etc. The encoder 5 is responsible for encoding the received multimedia content. The encoder 5 is compliant with, for instance, one of the MPEG standards, or with H263.

The encoder 5 and the slicer 6 are either implemented in a single device or in two separate devices. In both cases, what is transmitted from the encoder 5 to the slicer 6 is an encoded video stream. Advantageously, this encoded video stream is transmitted from the encoder 5 to the slicer 6 over IP by using the RTP protocol. This is not restrictive. By way of example, the transport layer of the MPEG-2 standard, known as MPEG-2 TS, could be used as well.

In practice, the files generated by the slicer 6 are stored in a storage unit 26 to which the content server 8 has access. The storage unit 26 is shared by the slicer 6 and the content server 8. The storage unit 26 may be part of the content server 8 or can be located remotely.

The slicer 6 has the following functions:
a) It slices the encoded content generated by the encoder 5 into a plurality of slices, where each slice comprises a given amount of time of the encoded multimedia content.
b) It generates a file from each slice.
c) It implements an encryption algorithm, such that at least the slice contained in a file cannot be used without a decryption key associated therewith. This can be achieved by encrypting the slice or encrypting the file. Encrypting the files has the advantage of simplicity. Encrypting the slices is more complex. However, it allows accessing the file information contained in the file structure (for example, in the headers) at the client side without having to decrypt the file first. By way of example, the encryption algorithm used by the slicer 6 is AES (Advanced Encryption Standard). Encryption is done by using an encryption key. An associated decryption key is needed to achieve decryption of the encoded entity (the slice or the file). The key server 15 is responsible for delivering the encryption key to the slicer 6 and the decryption key to the client device 14.

The slicer 6 can generate a plurality of sets of files for the same multimedia content. By way of example, when the slicer 6 generates a plurality of sets of files, a plurality of sets of slicing positions can be used, each set of slicing positions being shifted in time as compared with the other sets of slicing positions. Generating a plurality of sets of files is advantageous because it allows reducing the delay experienced by the client when he sends a request for a live content.

Figure 3:
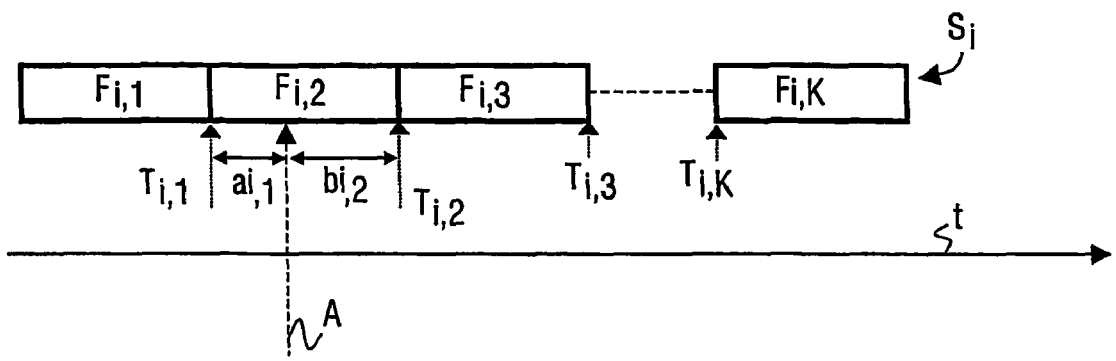
FIG. 3 is a schematic representation of a set of files generated by a slicer according to the invention.

FIG. 3 is a representation of a set $S_i$ of files $F_{i,j}$ (j=1, ..., N) generated by the slicer 6 by slicing an encoded multimedia content at slicing positions $T_{i,j}$ (j=1, ..., N−1).

In an advantageous embodiment, the slices are generated in such a way that they can be decoded independently of each other. In practice, any encoded multimedia content generated by a multimedia encoder comprises so-called Random Access Points (RAP). In order to produce slices that can be decoded independently of the others, the slicer 6 slices the encoded multimedia content in such a way that each slice starts with a Random Access Point. For instance, when the encoder is compliant with the MPEG-2 or MPEG-4 standard, the random access points are the I-frames of the MPEG-encoded multimedia content, and the slicing positions are chosen in such a way that the first frame of each slice is an I-frame.

Optionally, the size of the slices is adjustable. It may be identical for all slices or it may vary from one slice to another (for instance, the size of the slices may increase with time). The best efficiency is obtained with files that are relatively long because the more files are transported, the more overhead due to file headers is obtained.

Each file generated by the slicer 6 is stored as a file in the storage unit 26. The storage unit 26 has to be "cleaned" on a regular basis to ensure that there is room available for storing the newly generated files. A way of cleaning the storage unit is to re-use file names on a regular basis. An alternative way is to use different file names for each file, and to delete the aging files on a regular basis.

The content server 8 and the key server 15 are linked to the distribution network 10. The client device 14 has access to the distribution network 10 via the access provider 12. Typically, the client device 14 can load, through the distribution network 10, a page containing at least one link to one encoded multimedia content that the content server 8 offers to download. When a user clicks on said link, an initial request $R_0$ directed to said encoded multimedia content is sent automatically to the content server 8. There are several possible ways for the content server 8 to handle the initial request $R_0$.

In a first embodiment, the content server 8 downloads a single file in response to the client request. This implementation can be used for specific applications, for instance, for applications offering the client to pick up information regarding a live event. It can also be used with a player 22 specifically designed to cause the client device 14 to send the initial request $R_0$ repetitively.

In a second embodiment, the content server 8 downloads the files one by one as soon as they are ready at the server side. This embodiment has the advantage of being easy to implement. However, there is a risk that certain client browsers will not support reception of several files in response to one single request.

In a third embodiment, the content server 8 sends a document to the client device 14 upon reception of the initial request $R_0$. This document causes the client device 14 to repetitively send a fetching request designating the encoded multimedia content.

By way of example, the document sent by the content server 8 may be a page comprising an automatic refresh command. An example of such a page is given below:

```
<html>
<head>
<META meta http-equiv="Refresh" content="134" ;
url='http://www.yoursite.com/live2download.html'">
</head>
<embed src="live2download.mp4" width="240" height="240">
</embed>
</html>
```

Such a page causes the client browser to reload the file "live2download.mp4" every 134 seconds (which is the duration of a file in this example).

Alternatively, the document sent by the content server 8 may be a standard description of the multimedia content, said standard description being intended to be processed by the player 22 in a standard way. Such a description may be, for instance, an SMIL description (SMIL is a W3C standard defining XML-based audio/video scene descriptions). An example of such an SMIL description is given below:

```
<smil>
<head>
<layout>
<root-layout width="240" height="240" background-color="white"/>
<region regionName="im" left="0" top="0" width="240" height="240"/>
</layout>
</head>
<body>
<seq repeatCount = "indefinite" >
<video id="vid" src="live2download.mp4" region="im" />
</seq>
</body>
</smil>
```

The effect of this SMIL document is to cause the player 17 to play the file "live2download.mp4" repetitively. As a result, the client device will repetitively send fetching requests directed to the file "live2download.mp4".

Advantageously, the SMIL document sent by the content server 8 comprises a command indicating that the files have to be fetched some time in advance (that is, some time before the end of the playback of the previous file). This ensures that the next file will arrive at the client device 14 in time so that the client will not experience a gap in the rendering of the multimedia content. An example of an SMIL description having such a command is given below:

```
<smil>
<head>
<layout>
<root-layout width="240" height="240" background-color="white"/>
<region regionName="im" left="0" top="0" width="240" height="240"/>
</layout>
</head>
<body>
<seq repeatCount = "indefinite" >
<video id="vid" src="live2download1.mp4" region="im"
clipBegin = "0s" dur = "25s" />
<par>
<prefetch src="live2download2.mp4" mediaTime ="5s" />
<video id="vid" src="live2download1.mp4" region="im"
clipBegin = "25s" />
</par>
<video id="vid" src="live2download2.mp4" region="im"
clipBegin = "0s" dur = "25s" />
<par>
<prefetch src="live2download1.mp4" mediaTime ="5s" />
<video id="vid" src="live2download2.mp4" region="im"
clipBegin = "25s" />
</par>
</seq>
</body>
</smil>
```

This document is written for slices containing 30 s of content. It causes the player 17 to execute the following operations in sequence:

a) playing the first 25 s of a first source (live2download1.mp4);

b) playing the last 5 s of the first source and in parallel fetching the first 5 s of a second source (live2download2.mp4);

c) playing the first 25 s of the second source (which can be done without delay since the first 5 s have been prefetched).

Using two different sources is an implementation trick. The content server 8 must be designed to recognize that the first and the second source correspond to the same encoded multimedia content.

When the content to be downloaded is a live content, the server has to select which file to download upon reception of the initial request $R_0$ or upon reception of the fetching requests. The content server 8 can either select the most recent file or the first file to get ready. The consequence of selecting the most recent file is that the client will receive outdated data. The consequence of selecting the first file to get ready is that the client will have to wait a certain time before getting a response. In FIG. 2, an arrow A indicates the reception of the initial request $R_0$ by the content server 8. If the downloaded file is file $F_{i,1}$, the client will not experience any delay; however he will receive data that will be late by a time equal to $a_{i,1}$. If the downloaded file is file $F_{i,2}$, the client will not receive outdated data; however, he will experience a delay equal to $b_{i,2}$.

When the download of a file is achieved, the client device 14 has to acquire the associated decryption key in order to be able to play the content of the file. Two ways of acquiring this decryption key will now be described with reference to FIG. 4 and FIG. 5, respectively.

Figure 4:
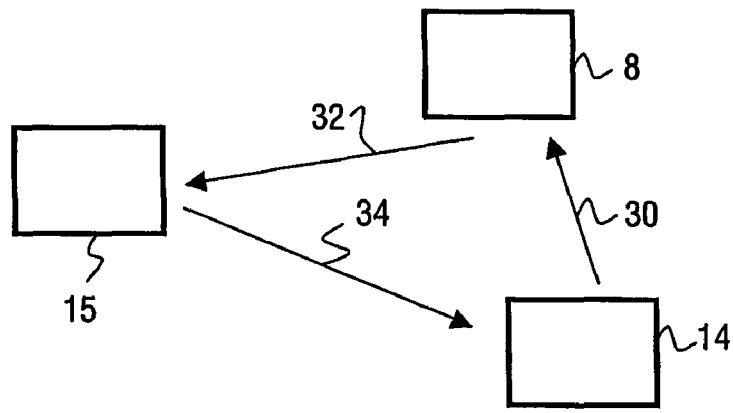
FIG. 4 is a first example of a protocol to be implemented for the client device to acquire the decryption key associated with a specific file.

In FIG. 4, the client device 14 sends an acknowledgment 30 to the content server 8 indicating that the download was successfully completed. Upon reception of the acknowledgement 30, the content server 8 sends a notification 32 to the key server 15. Upon reception of the notification 32, the key server 15 sends a message 34 containing the appropriate decryption key to the client device 14.

Figure 5:
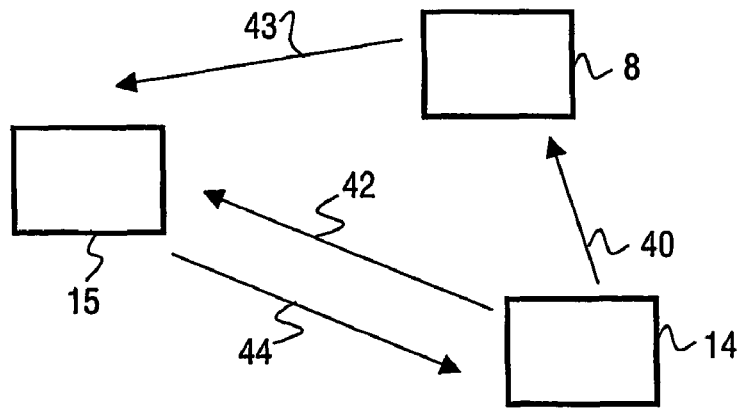
FIG. 5 is a second example of a protocol to be implemented for the client device to acquire the decryption key associated with a specific file.

In FIG. 5, the client device 14 sends an acknowledgment 40 to the content server 8 indicating that the download was successfully completed and a request 42 to the key server 15. Upon reception of the acknowledgement 40, the content server 8 sends a notification 43 to the key server 15. Upon reception of the notification 43 and the request 42, the key server 15 sends a message 44 containing the appropriate decryption key to the client device 14.

The transmissions via the distribution network 10 are ruled by the HTTP protocol.

Figure 6:
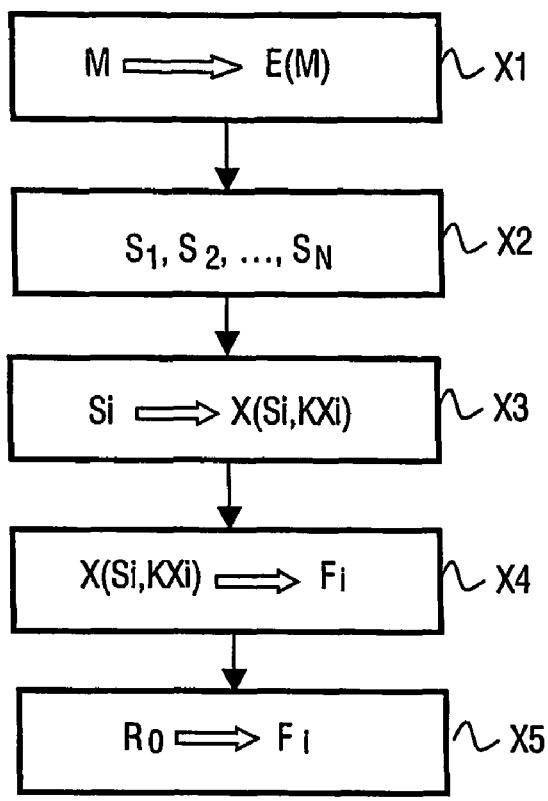
FIG. 6 is a block diagram of a first example of a method according to the invention for downloading a live multimedia content.
Figure 7:
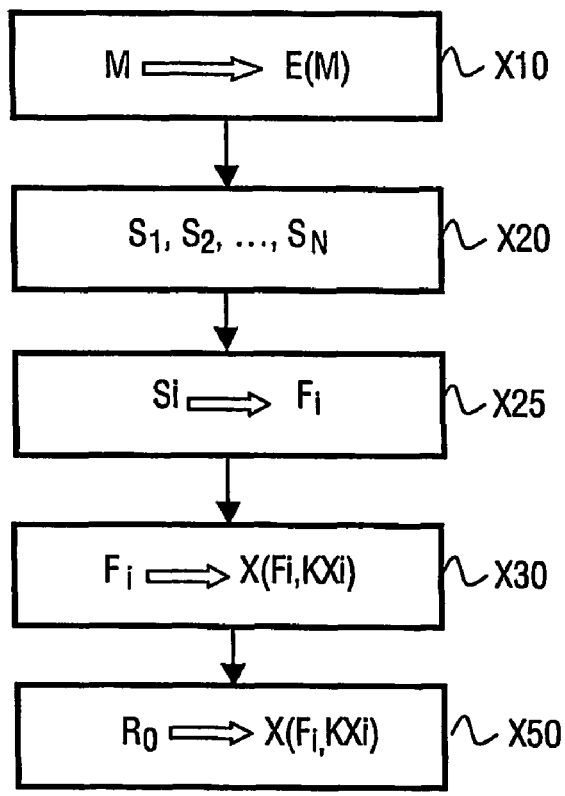
FIG. 7 is a block diagram of a second example of a method according to the invention for downloading a live multimedia content.

A first example of a method according to the invention of transmitting a multimedia content M to a client device 14 will now be described with reference to FIG. 6. It comprises:
- a step X1 of producing an encoded multimedia content E(M) from the multimedia content M,
- a step X2 of slicing the encoded multimedia content E(M) into a set of slices Si,
- a step X3 of encrypting a slice Si (or a group of slices) with an encryption key KXi by applying an encryption algorithm X, thereby providing encrypted slices X(Si, KXi),
- a step X4 of providing a set of files Fi, where each file Fi contains an encrypted slice X(Si, KXi),
- a step X5 of downloading at least one of said files Fi to the client device 14 via the distribution network 10 upon reception of an initial request $R_0$ directed to the multimedia content M from the client device 14.

A second example of a method according to the invention of transmitting a multimedia content M to a client device 14 will now be described with reference to FIG. 6. It comprises:
- a step X10 of producing an encoded multimedia content E(M) from the multimedia content M,
- a step X20 of slicing the encoded multimedia content E(M) into a set of slices Si,
- a step X25 of providing a set of files Fi, where each file Fi contains a slice Si,
- a step X30 of encrypting a file Fi (or a group of files) with an encryption key KXi by applying an encryption algorithm X, thereby providing encrypted files X(Fi, KXi),
- a step X50 of downloading at least one of said files X(Fi, Kxi) to the client device 14 via the distribution network 10 upon reception of an initial request $R_0$ directed to the multimedia content M from the client device 14.

These steps are implemented by way of specific hardware and/or software comprised in one or several devices. For instance, steps X1 and X10 are implemented by the encoder 5, steps X2, X3, X4 and X20, X25, X30 are implemented by the slicer 6, and steps X5 and X50 are implemented by the content server 8.

With respect to the described network, server, system, slicer, client device, and downloading method, modifications or improvements may be proposed without departing from the scope of the invention. The invention is thus not limited to the examples provided.

File transfer protocols other than HTTP may be used (for example, FTP).

The content server and the key server may be the same physical entity. The encryption may be either applied to the slices or to the files. The encryption key and the associated decryption key may be different or identical, depending on the encryption algorithm that is used.

Use of the verb "comprise" and its conjugations in the description and in the claims does not exclude the presence of elements or steps other than those stated in the description and in the claims.

Use of the article "a" or "an" to designate an element or a step does not exclude the presence of a plurality of such elements or steps.

The invention claimed is:

1. A system comprising at least:
a source that acquires a multimedia content];
an encoder that encodes said multimedia content;
a slicer that slices said encoded multimedia content into a plurality of slices, wherein each of the slices is decoded independently, and generates a file from each of the slices, said slicer implementing an encryption algorithm, such that the slice contained in the file cannot be used without a decryption key associated therewith];
a distribution network; an access provider that provides a client device with an access to said distribution network;
a content server linked to said distribution network and downloading said encoded multimedia content on a file-by-file basis to said client device via said distribution network upon reception of a request from said client device; and
a key server linked to said distribution network that provides said client device with the at least one decryption key associated with the at least one downloaded file.

2. The system of claim 1, wherein the decryption key is provided to said client device upon successful downloading of the file associated with the decryption key.

3. A content server having access to files generated by slicing an encoded multimedia content into a plurality of slices, wherein each of the slices is decoded independently and the files are generated from each of the slices by implementing an encryption algorithm such that the slice contained in a file cannot be used without a decryption key associated therewith, said content server having means for downloading said encoded multimedia content on a file-by-file basis to a client device upon reception of a request from said client device, and means for sending a notification to a key server upon successful downloading of a file to said client device so that said key server provides said client device with the decryption key associated with said file.

4. A content server having access to files generated by slicing an encoded multimedia content into a plurality of slices, wherein each of the slices is decoded independently and the files are generated from each of the slices by implementing an encryption algorithm such that the slice contained in a file cannot be used without a decryption key associated therewith, said content server having means for downloading said encoded multimedia content on a file-by-file basis to a client device upon reception of a request from said client device, wherein said downloading means comprise:
- means for sending a document to said client device upon reception of said request, said document causing said client device to repetitively send a fetching request designating said encoded multimedia content;
- means for selecting which file is to be downloaded upon reception of said fetching requests from said client device; and
- means for downloading the selected file.

5. A client device having:
- means for connection to a content server, said content server having access to files (generated by slicing an encoded multimedia content into a plurality of slices, wherein each of the slices is decoded independently and the files are generated from each of the slices by implementing an encryption algorithm, such that the slice contained in a file cannot be used without a decryption key associated therewith, said content server downloading said encoded multimedia content on a file-by-file basis;
- means for repeatedly sending to said content server a request directed to said encoded multimedia content;
- means for receiving one of said files in response to each request;
- means for acquiring the decryption key associated with each file; and
- means for decrypting and playing said files.

6. The client device of claim 5, further comprising:
- means for sending a subsequent request before ending playback of a current file.

7. A method of transmitting an encoded multimedia content to a client device, said method comprising the steps of:
- encoding a multimedia content;
- slicing said encoded multimedia content into a plurality of slices, wherein each of the slices is decoded independently and a file is generated from each of the slices by an encryption step, such that the slice contained in a file cannot be used without a decryption key associated therewith; and
- downloading said encoded multimedia content on a file-by-file basis to said client device via said distribution network upon reception of a request from said client device.

8. The system of claim 1, wherein payment for said multimedia content is progressive, limited to only downloaded files of said multimedia content.

9. The content server of claim 3, wherein payment for said multimedia content is progressive, limited to only downloaded files of said multimedia content.

10. The client device of claim 5, wherein payment for said multimedia content is progressive, limited to only downloaded files of said multimedia content.

11. The method of claim 7, wherein payment for said multimedia content is progressive, limited to only downloaded files of said multimedia content.

12. The content server of claim 4, wherein payment for said multimedia content is progressive, limited to only downloaded files of said multimedia content.

* * * * *